Feb. 21, 1950  G. G. SCHNEIDER ET AL  2,498,455
HEATER INSERTING MECHANISM
Filed Jan. 10, 1946  7 Sheets-Sheet 3

INVENTORS.
GERHARD GUNTHER SCHNEIDER
and FRANK L. DONOHUE
BY
J. H. Ebert
ATTORNEY

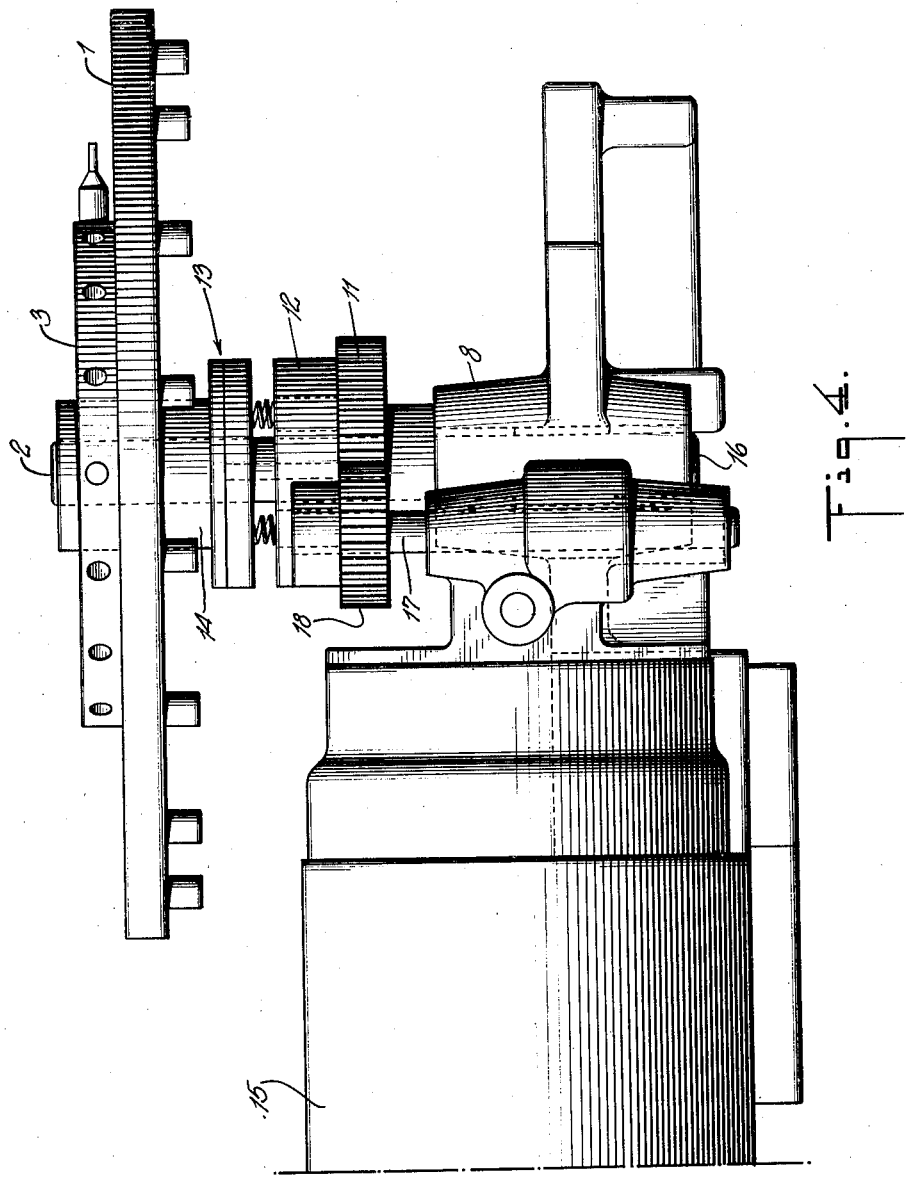

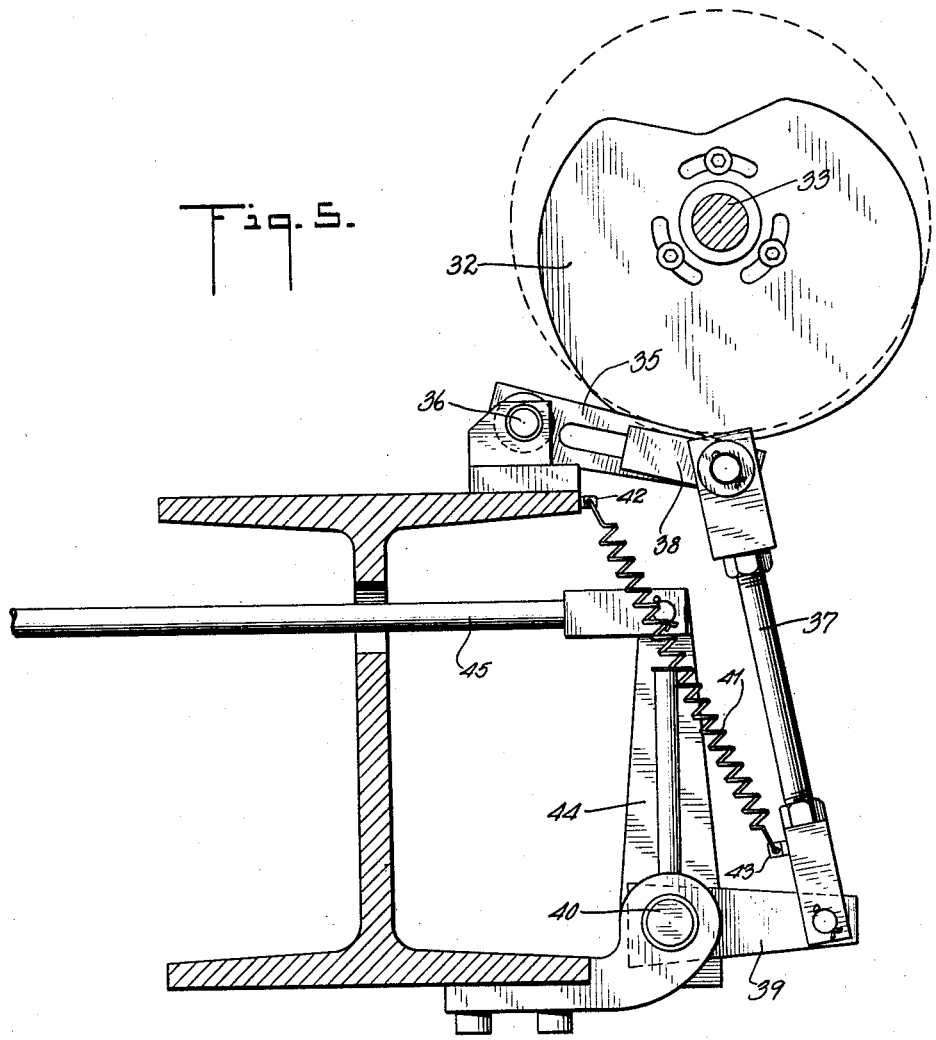

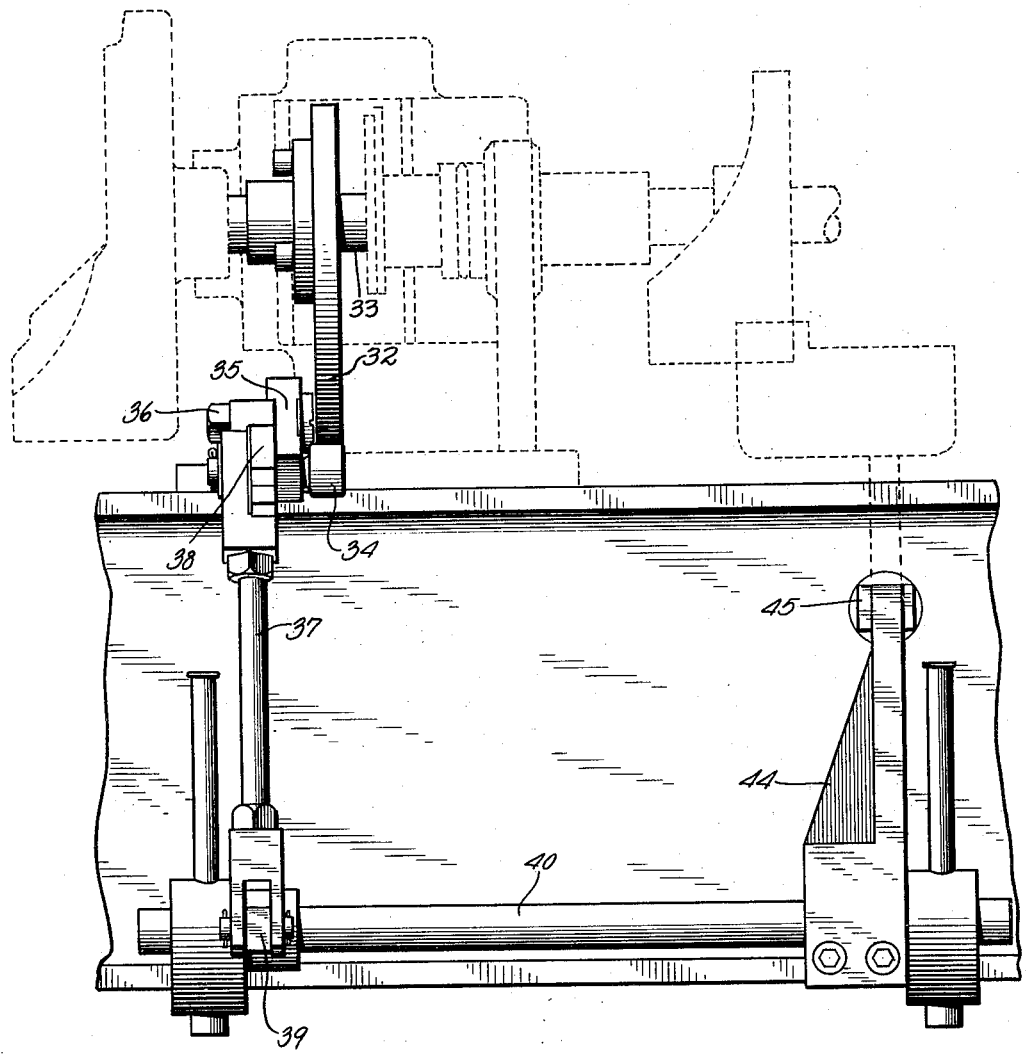

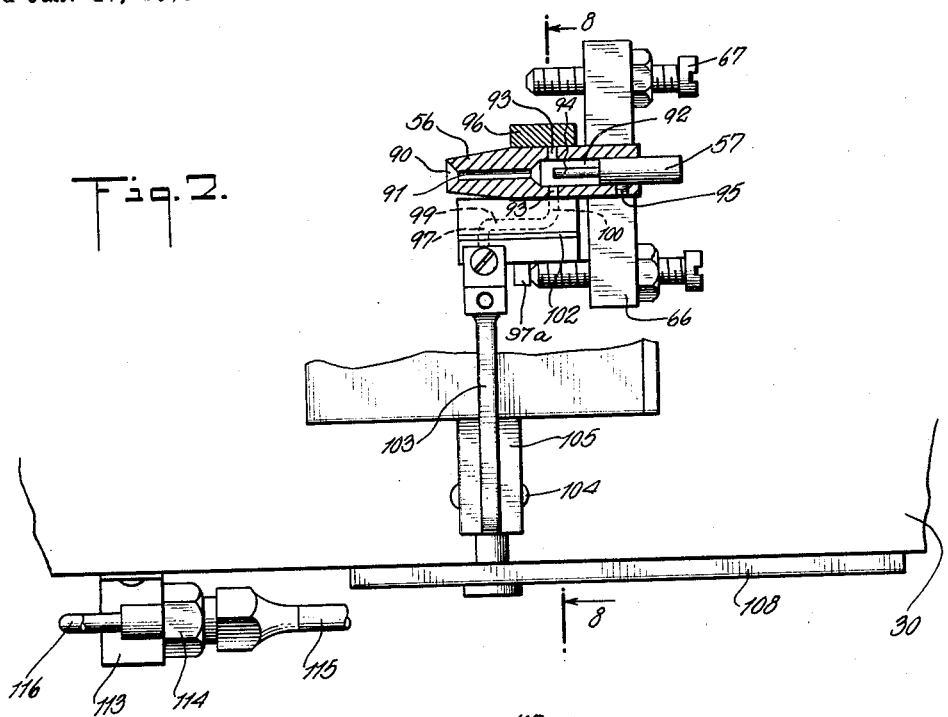
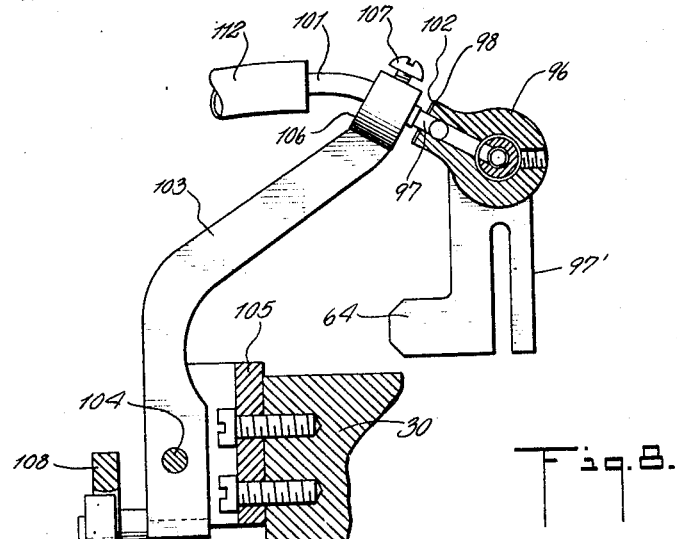
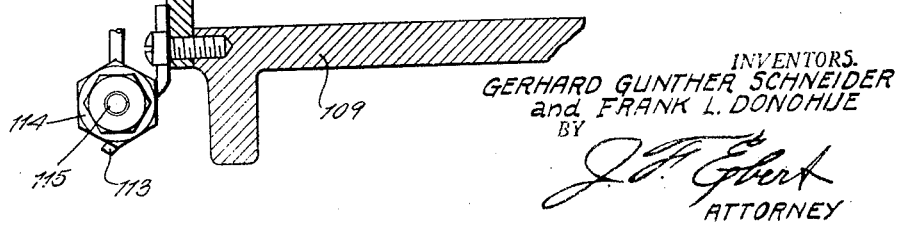

Patented Feb. 21, 1950

2,498,455

UNITED STATES PATENT OFFICE 2,498,455

HEATER INSERTING MECHANISM

Gerhard Gunther Schneider and Frank L. Donohue, Maplewood, N. J., assignors to National Union Radio Corporation, Newark, N. J., a corporation of Delaware Application January 10, 1946, Serial No. 640,346

5 Claims. (Cl. 29—25.19)

The invention herein disclosed relates to a mechanism for inserting heating elements into cathodes.

A heating element or heater for a cathode consists of a folded wire of a diameter ranging between two and ten thousandths of an inch. Heretofore, and prior to the invention herein disclosed, such heating elements were inserted into cathodes manually. Because of the small size of the cathode, the springiness and small size of the wire of the folded heater, this has been a tedious and time-consuming operation.

An object of this invention is to provide a mechanism for receiving the heating element in its folded condition and inserting the heating element in a cathode. Another object of the invention is to provide a heater inserting mechanism of this kind that may operate in conjunction with and form a part of a heater folding machine.

The foregoing objects and certain advantages inherent in the invention that will hereinafter appear are realized in the embodiment of the invention illustrated in the accompanying drawings and described in detail below.

Figure 1:
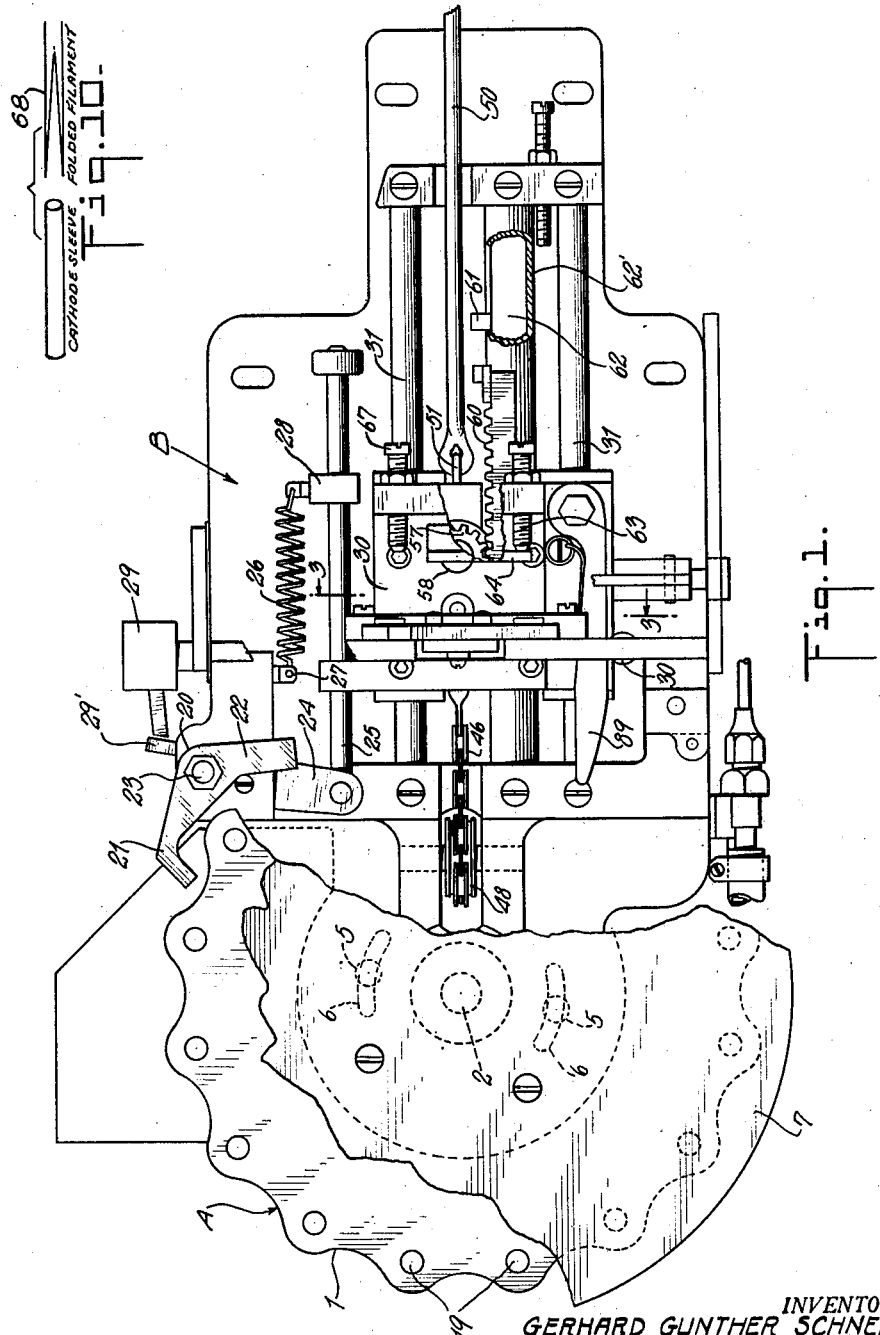
Figure 2:
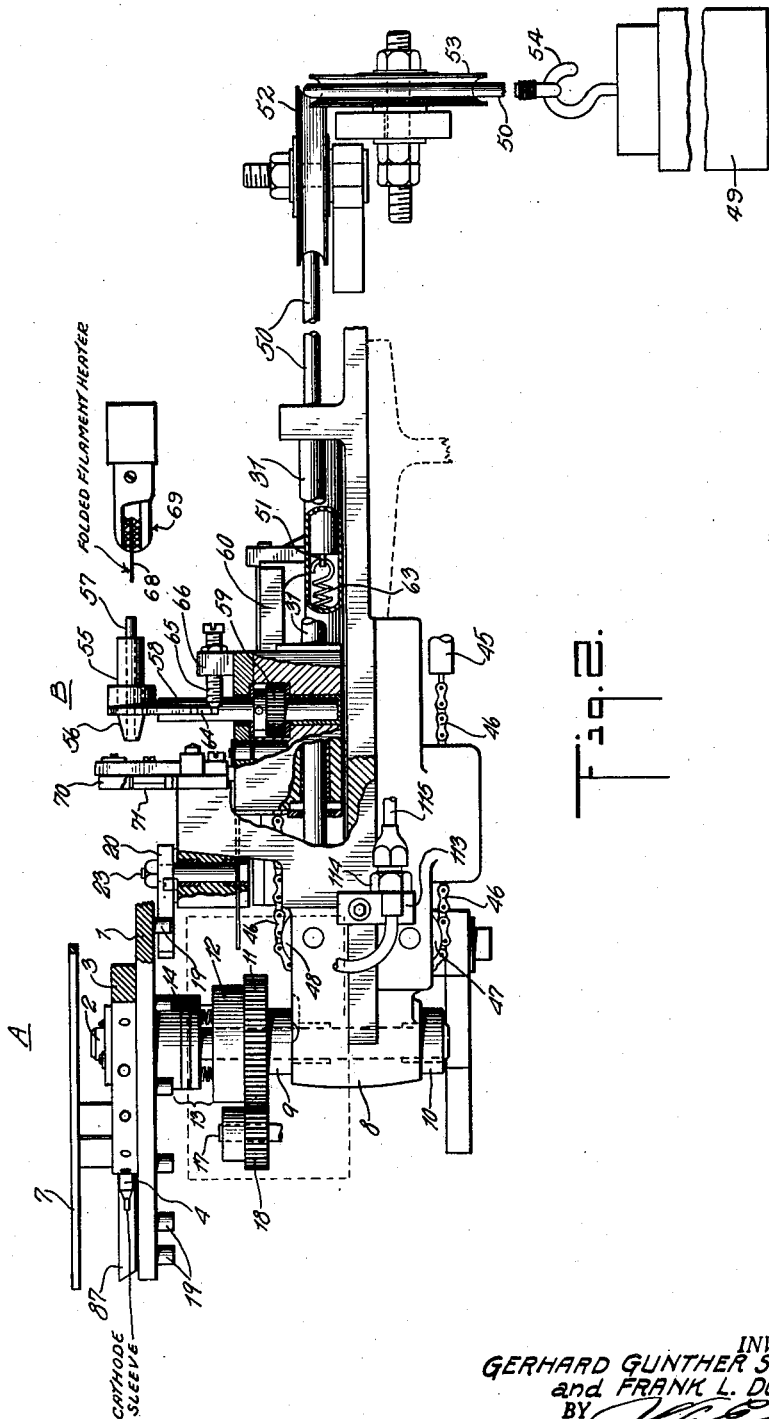
Figure 3:
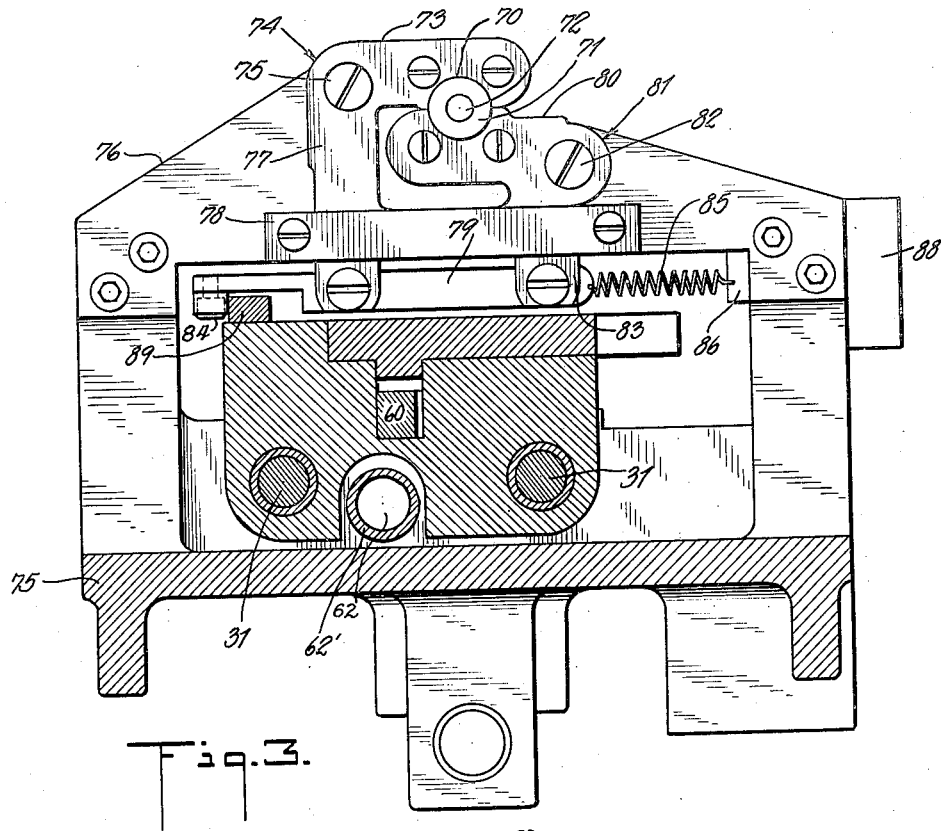

The drawings include:

Fig. 1 which is a plan, partly broken away, of a mechanism constituting one specific embodiment of the invention;

Fig. 2 which is a side elevation of the same, partly broken away;

Fig. 3 which is a transverse section taken on the line 3—3 of Fig. 1;

Fig. 4 which is an end elevation of the cathode holder;

Fig. 5 which is a side elevation of the drive connection; and

Figure 9:
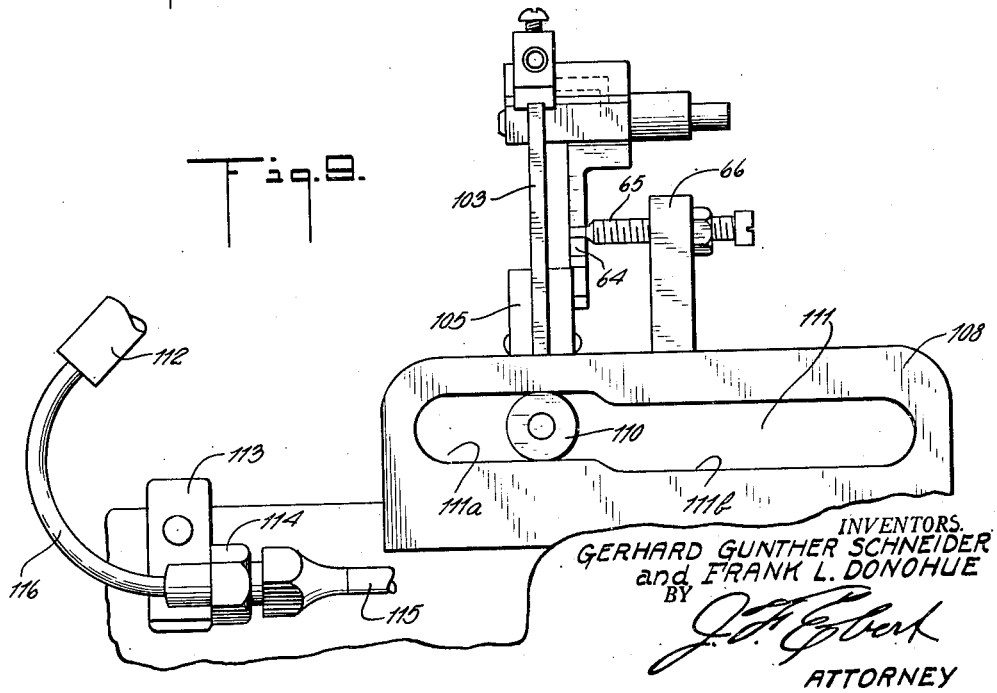

Fig. 6 which is a rear elevation of the same;

Fig. 7 which is a fragmentary plan, partly in section, illustrating the transfer piece and the air connection thereto;

Fig. 8 which is a fragmentary sectional elevation of the same taken on the line 8—8 of Fig. 7; and Fig. 9 which is a fragmentary elevation of the same.

Fig. 10 is a view of a typical cathode sleeve and folded fine wire filament which are to be assembled by the machine according to the invention.

There is shown in the left-hand portion of Fig. 10, in approximately actual size, a typical cathode sleeve and the corresponding folded filament which is to be inserted within the sleeve. This filament is of relatively fragile structure and cannot be telescoped into the sleeve by ordinary push-fit mechanisms. The machine according to the present invention, enables such a filament to be assembled within the relatively small sleeve without danger of the filament being broken or the insulation material thereon being cracked during the assembling operations.

In general, the mechanism illustrated in the drawing includes a cathode holder, designated by the reference character A, and a transfer mechanism, designated by the character B for transferring a heater from a holder therefor, or from a heater folding machine, to a cathode held by the cathode holder A. The cathode holder is arranged to hold a plurality of cathodes and it is actuated to bring the several cathodes, individually and successively into heater receiving position. Its action is coordinated with the action of the transfer mechanism. This transfer mechanism reciprocates between heater-receiving and heater inserting position. At the heater-receiving position, the transfer mechanism receives a folded heater and moves to the inserting position. A cathode is positioned by the holder such that at the end of the movement of the transfer mechanism towards inserting position, the heater is inserted in the cathode.

The cathode holder includes a disk 1, resembling a gear. This disk is rotatably mounted on a vertical shaft 2 and carries another disk 3 of smaller diameter from which mandrels 4 extend radially thereof. The disk 3 is secured to the disk 1 by machine screws 5 threaded into the disk 1 and extending through arcuate slots 6 in the disk. In this way, the disk 3 may be adjusted, about the axis of the shaft 2, with respect to the disk 1. To the disk 1, there may be secured a protective transparent plate 7. This plate extends well beyond the mandrels 4 and a cathode thereon to protect the mandrels against accidental damage.

The shaft 2 is fixed in a bracket 8 and held in place by spaced collars 9 and 10 engaging the shaft and the ends of the bracket. On the shaft 2, there is rotatably mounted a gear 11 having a hub 12. A friction drive 13, capable of slipping, connects the gear hub 12 and a hub 14 depending from the disk 1. Through this friction drive, torque is applied to rotate the disk 1 upon rotation of the gear 11.

The gear 11 is rotated by an electric motor 15. This motor is connected, through a reducing worm drive 16, to rotate a shaft 17. A pinion 18, secured on the shaft 17 for rotation therewith, meshes with the gear 11.

For positioning the mandrels, individually and successively in heater receiving position, an escapement mechanism is utilized. This mechanism includes a series of depending pins 19, sixteen in number—one for each mandrel, secured in the disk 1 and equally, angularly spaced about the disk. An escapement lever 20 is positioned to engage the pins 19. This lever has an arm 21 with a hooked end section and an arm 22. The lever is secured, between its ends, on a vertically mounted, rotatable pivot 23. A lever 24 is secured at one end to the pivot and at the other end to a slidable push rod 25 that is actuated, as hereinafter explained, by the transfer mechanism. The push rod is resiliently urged, to a position in which the arm 22 of the lever 20 is in the path of a pin 19, by a spring 26. The spring is secured at one end to a stationary bracket 27 and at the other end to a bracket 28 fast on the rod 25.

When the rod 25 is free to respond to the force of the spring 26, the arm 22 moves in to abut against a pin 19 and hold the disk 1 fixed and positioned with a mandrel in heater-receiving position. When the rod is moved against the spring, the arm 22 is moved out of contact with a pin 19, and the arm 21 moves into the path of the pins 19. In this way, the arm 22 engages successive pins and positions the disk 1 so that the mandrels 4 are individually and successively brought into heater-receiving position.

In order that the motor 15 be not continually operated, and for the purpose of reducing wear on the friction drive, a micro switch 29 is utilized to control energization of the motor. The switch is controlled by a pin or lever 29' connected to the escapement arm to effect concomitant operation of the motor and escapement mechanism.

The transfer mechanism includes a carriage or slider body 30 that is slidably mounted on spaced rails 31. The carriage is moved along the rails, toward the cathode holder or heater-inserting position (to the left, as seen in Fig. 2) by a cam 32 (Figs. 5 and 6) that is secured on a drive shaft 33. A cam follower 34, carried at one end of an arm 35 engages the cam 32. The arm 35 acts about a fixed pivot 36 and actuates a connecting rod 37. The connecting rod 37 is pivoted at one end to a sliding clamp 38 mounted on the arm 35 and at the other end to a lever 39 secured on a turn shaft 40. A spring 41 acts between a fixed bracket 42 and a bracket 43 on the connecting rod to maintain the cam follower in contact with the cam. Another lever 44 secured on the shaft 40 reciprocates, upon oscillation of the shaft, a rod 45 that is pivoted at one end to a lever 44. The rod 45 is secured to one end of a chain 46 which passes around two idler pulleys 47 and 48 and is secured to the carriage 30. The pull on the chain, by the action of the cam and cam follower, moves the carriage to heater inserting position (to the left, Fig. 2) that is toward the cathode holder. By adjusting the position of the connecting rod pivot on the arm 35, by means of the sliding clamp 38, the amount of motion produced by the cam 32, may, to a certain degree, be regulated.

The carriage is moved in the opposite direction, to heater-receiving position (to the right, Fig. 2) by weight 49. For this purpose, one end of a cable 50 is secured, through an eye 51, to the carriage. The cable passes around a horizontal pulley 52 and over a vertical pulley 53 to a hook 54 secured to the weight 49.

On the carriage there is mounted a rotatable member, or transfer piece 55, that has a cone-shaped front portion 56 with a bell-mouthed hole of a diameter to suit the size of the heater to be transferred. In the back of the transfer piece there is a round stop pin 57 that can be adjusted to suit the length of the heater.

The transfer piece 55 is mounted on a rotatable shaft 58 extending into the carriage 30. Within the carriage, there is fast on the shaft 58, a pinion 59. The pinion 59 engages a rack 60 that is slidably mounted with respect to the carriage 30. In the path of the rack 60, as the carriage moves to heater-receiving position (to the right as seen in Figs 1 and 2), there is a pin 61 that is mounted on a plunger 62 which is slidably mounted in a tube 62'. The pin extends through a slot, provided therefor, in the tube 62'. The plunger 62 is resiliently biased to hold the pin against movement with the rack by a spring 63. A like pin, arranged in like manner, is in the path of the opposite end of the rack and engages the rack upon movement of the carriage in the opposite direction.

As the carriage 30 moves toward heater inserting position, the end of the rack engages the pin 61. The carriage in its continued movement, moves relative to the rack and the pinion 59 rotates. The shaft 58 is thus rotated, clockwise as seen in Fig. 1, and a radial bracket 64, extending from the shaft moves away from an adjustable stop screw 65 mounted in a threaded bracket 66 on the carriage. After the shaft has rotated through one hundred and eighty degrees, so that the transfer piece 55 points in the opposite or heater-receiving direction, the bracket 64 engages another adjustable stop screw 67 threaded through the bracket 66 on the carriage. Further rotation of the shaft 58 and the transfer piece is thus prevented and the transfer piece is positioned, on continued movement of the carriage, to receive a heater, such as the heater 68 held in a holder 69. During the further movement of the carriage to the point where the opening in the transfer piece 55 moves over the heater, the rack moves with the carriage against the action of the spring 63. The tension of the spring, however, maintains a force, through the rack and pinion, such as to maintain the bracket 64 against the stop screw 67 and aligned with the heater 68.

Desirably, the holder 69, may be the heater receiving jaws of the heater folding machine disclosed and described in the copending application Serial No. 562,356, filed November 7, 1944 for Heater folding machines, and now Patent No. 2,448,916, granted Sept. 7, 1948. In such case, the inserting mechanism herein described would be attached to the machine and the cam 32 would be mounted on a shaft of the heater folding machine to coordinate the action of the folder and inserting mechanism. However, it will be obvious that the inserting mechanism may be utilized independently of a folding machine and receive folded heaters from any holder therefor for insertion in a cathode. In such case, the shaft 33, on which the cam 32 is mounted could be driven by a prime mover such as an electric motor.

When the heater is received by the transfer piece and released by the holder 69, the carriage 30 moves in the opposite direction, to heater inserting position. During the first portion of such movement, due to the tension of the spring 63 and the freedom of the rack to move with the carriage, the transfer piece is not rotated. However, when the opposite end of the rack engages the resiliently mounted pin in its path, the rack stops, and the shaft 58 rotates until the bracket 64 engages the stop pin 65. The transfer piece is thus aligned, positioned as shown in Fig. 2, to insert a heater into a cathode and on further movement of the carriage, the transfer piece remains thus aligned as previously described.

To insure alignment of a cathode on a mandrel 4 with the transfer piece as the transfer piece moves longitudinally to insert a heater, relatively movable jaws 70 and 71 are positioned to engage the cathode. In the closed position (Fig. 3) the jaws have a funnel-shaped opening 72 therethrough converging away from the faces toward the transfer piece 55. The upper jaws 70 is at one end of one arm 73 of a bell crank lever 74, pivoted on a pivot screw 75 extending into a bracket 76 extending from the frame 75 of the mechanism. The other arm 77 of the bracket extends behind a guide bar 78 and is pivotally secured to a transverse, slidable link 79. The lower jaw is at one end of an arm 80 of another bell crank lever 81. This lever is pivoted at 82 and the other arm 83 thereof extends behind the guide bar 78 and is pivotally secured to the slidable link 79. At one end, the slidable link 79 carries a cam roller 84. One end of a spring 85 is secured to the opposite end of the link 79 and the other end of the spring is secured to a fixed bracket 86. The spring acts to move the link 79 in a direction to open the jaws, to the right as seen in Fig. 3, and the jaws are normally biased to the open position so that a cathode, such as the cathode 87, on a mandrel can move between the jaws when the cathode holder indexes.

As the carriage moved to heater-receiving position, an arm 88 extending from the carriage engaged the bracket 28 on the escapement rod 25. The rod was thus moved to actuate the escapement lever and the switch 29. Upon return movement of the carriage, the rod moved under the action of the spring 26. Thus, the cathode holder indexed and a cathode moved between the open jaws 70 and 71. As the transfer piece moves toward the heater-inserting position, the jaws close on the cathode therebetween. This is effected through the cam roller 84 and a cam arm 89 mounted on the carriage. During the movement of the carriage to heater-inserting position and about the time the turning of the transfer piece is complete, the cam arm 89 engages the cam roller 84 and moves the link 79, against the action of the spring 85 to cause the funnel-shaped jaws 70 and 71 to close. Upon further movement of the transfer piece, the heater carried thereby enters, through the funnel-shaped jaws and into the cathode. The carriage then returns, the jaws open and the cathode holder indexes.

In the case of long heaters, it is necessary to provide a blast of air through the transfer piece at the time it is drawing back from inserting a heater in a cathode. This prevents the heater from pulling out of the cathode. Air is preferably used, as distinguished from a mechanical push out, because of the cleaning action of the air in blowing dust out of the hole in the transfer piece and the split nozzle 72 or funnel-shaped jaws 70 and 71. Even in the case of short heaters an air blast is desirable because of this cleaning action.

An arrangement utilized for providing an air blast as the transfer piece 55 moves away from heater-inserting position is illustrated in Figs. 7, 8 and 9 of the drawings. The transfer piece 55 has a longitudinal opening therethrough which consists of a flared mouth 90 at the end of the cone-shaped front portion 56, a heater-receiving passage 91, and a passage 92 of larger diameter than the heater-receiving passage 91 for receiving the stop pin 57. Adjacent the connection of the passage 91 with the passage 92, there are provided radial passages 93 which extend through the wall of the transfer piece and communicate with the passage 92. The pin 57 has an extension 94 of reduced diameter which extends into the passage 92. The diameter of the extension 94 is such as to provide an annular space between the pin and the wall of the passage 92. The stop pin 57 is held in adjusted position by a set screw 95.

The transfer piece extends through and is supported by a bracket 96 from which an adjusting plate 97a extends. The adjusting plate is received in the shaft 58 and has a lateral extension which constitutes the stop bracket 64. Air is delivered to the radial passages 93 in the transfer piece 55 through air passages in the bracket 96. These air passages include a radial passage 97 that extends through the wall 98 of the bracket 96. The passage 97 communicates with a lateral passage 99 which in turn is connected to a radial passage 100 which communicates with one of the radial passages 93 in the transfer piece 55.

Air is delivered to the passage 97 by the engagement of the end of an air tube 101 with the end of the passage 97. To insure a tight connection, a rubber gasket plate 102 is secured on the wall 98 of the bracket 96. The tube 101 is carried by a lever 103 that is rotatable on a pivot 104 secured in a bracket 105 mounted on the carriage 30. The lever 103 has a head 106 formed thereon and the tube 101 extends through an opening in the head and is held in place therein by a set screw 107.

The lever is actuated to bring the end of the tube 101 into contact with the gasket 102 as the transfer piece is moved away from heater-inserting position by a cam 108 that is mounted on the base plate 109. For this purpose, the lever carries a cam roller 110 which extends into a cam slot 111 in the cam 108. The slot 111 includes two offset portions 111a and 111b and constitutes a positive cam. In the position shown in the drawings, the cam roller 110 is in the upper section 111a of the cam slot 111. In this position of the cam follower, the lever 103 is positioned so that the end of the tube 101 is in contact with the gasket plate 102. Air is then supplied through the tube 101 and passes through the passages 97, 99, 100, 93, 91 and out through the mouth 90 of the transfer piece. As the carriage moves away from heater-receiving position, the cam roller 110 moves into the portion 111b of the cam slot 111. As the roller moves into the portion 111b, the lever is actuated to move the tube 101 away from the gasket plate 102 and provide clearance for the subsequent rotation of the transfer piece. Air is supplied to the tube 101 through a flexible rubber hose 112. For this purpose, a bracket 113 is secured to the frame of the machine and carries a coupling 114 which connects an air supply line 115 to a tube 116 that is connected to the hose 112.

In the operation of the machine, as the transfer piece moves to heater-inserting position, the roller 110 moves into the portion 111a of the cam groove 111. This brings, as heretofore stated, the end of the tube 101 into contact with the rubber gasket plate 102. This condition maintains until the heater is inserted in the cathode. Immediately upon the start of the transfer piece away from heater-inserting position, an air valve (not shown) is actuated so that air is supplied through the hose 112 and into the passages of the transfer piece. The air blast continues until the heater is out of the transfer piece at which time the air valve is closed and the air cut off. At this time, the cam roller 110 moves into the portion 111b of the cam groove 111 and the lever 103 is actuated to move the air tube 101 away from the bracket 96. With this arrangement, the air blast through the passage 91 causes the heater to be pushed out of the transfer piece and retained in the cathode in which it was inserted. The air blast also cleans out the heater-receiving passage 91 and the split nozzle 72 and so avoids any failure of operation due to particles of insulation remaining in these passages.

It will be obvious that various changes may be made by those skilled in the art in the details of the embodiment of the invention illustrated in the drawing and described in detail above within the principle and scope of the invention as expressed in the appended claims.

We claim:

1. A machine for assembling radio tube cathodes and the like of the type having a cathode sleeve and a fine wire heater filament therein, comprising a rotatable magazine carrying a series of cathode sleeves projecting radially therefrom, a single head for holding a fine wire filament, said single head being rotatable around an axis parallel to the axis of rotation of said magazine, means to rotate said single head around its own axis between a filament loading position and another position where the loaded filament is longitudinally and radially aligned with one of said cathode sleeves, means to reciprocate said single head radially towards said aligned cathode sleeve to insert the loaded filament into said sleeve and then away from said sleeve, and air blast means communicating with said head and operated in timed relation to said reciprocation to retain the filament telescoped within said sleeve during the movement of said head away from said sleeve.

2. A machine according to claim 1 in which said head is provided with a reciprocating carriage on which said head is rotatably mounted, and means are provided for effective rotation of said head during one portion of the reciprocating movement of said carriage, and additional means are provided for holding said head against rotation during another portion of the reciprocating movement of the carriage.

3. A machine according to claim 1 in which a reciprocating carriage is provided for said head on which said head is rotatably mounted, and a slidably mounted rack is engageable with said carriage during only a portion of the reciprocating movement of the carriage to rotate said head.

4. A machine for inserting a fine wire folded filament into a corresponding cathode sleeve, comprising a cathode sleeve holder, a filament holder, means to operate said holders in mutual timed relation to bring said sleeve with its bore in longitudinal alignment with the length of the folded filament, means to move said holders relatively to each other in a longitudinal direction to telescope the filament into said bore, means to move said holders longitudinally relatively apart from each other after the filament has been telescoped within said sleeve, and air blast means connected in said filament holder for exerting a retaining force on the filament which is telescoped within said sleeve as the said holders move relatively apart.

5. A machine according to claim 4 in which said air blast means are provided with means for operating it in timed relation with respect to the movement of said holders.

GERHARD GUNTHER SCHNEIDER.
FRANK L. DONOHUE.

REFERENCES CITED

The following references are of record in the file of this patent:

UNITED STATES PATENTS

| Number | Name | Date |
| --- | --- | --- |
| 1,729,843 | Reich | Oct. 1, 1929 |
| 2,423,038 | Merwin | June 24, 1947 |